(12) United States Patent
Herman et al.

(10) Patent No.: US 11,676,303 B2
(45) Date of Patent: Jun. 13, 2023

(54) METHOD AND APPARATUS FOR IMPROVED LOCATION DECISIONS BASED ON SURROUNDINGS

(71) Applicant: FORD GLOBAL TECHNOLOGIES, LLC, Dearborn, MI (US)

(72) Inventors: David Michael Herman, Oak Park, MI (US); David Joseph Orris, Southgate, MI (US); Stephen Jay Orris, Jr., New Boston, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/405,718

(22) Filed: Aug. 18, 2021

(65) Prior Publication Data
US 2021/0374998 A1 Dec. 2, 2021

Related U.S. Application Data

(62) Division of application No. 16/199,394, filed on Nov. 26, 2018, now Pat. No. 11,127,162.

(51) Int. Cl.
| | |
|---|---|
| G06K 9/00 | (2022.01) |
| G06T 7/73 | (2017.01) |
| G06T 7/579 | (2017.01) |
| H04W 4/02 | (2018.01) |
| G06F 16/2457 | (2019.01) |

(52) U.S. Cl.
CPC ........... *G06T 7/75* (2017.01); *G06T 7/579* (2017.01); *H04W 4/023* (2013.01); *G06F 16/24575* (2019.01); *G06T 2207/10016* (2013.01); *G06T 2207/10028* (2013.01); *G06T 2207/30196* (2013.01)

(58) Field of Classification Search
CPC . G06T 7/75; G06T 7/579; G06T 2207/10016; G06T 2207/10028; G06T 2207/30196; G06T 2207/30244; G06T 2207/30252; G06T 7/73; G06T 7/70; H04W 4/023; G06F 16/24575; G01S 19/485; G01S 19/42
See application file for complete search history.

(56) References Cited

U.S. PATENT DOCUMENTS

| | | |
|---|---|---|
| 9,177,224 B1 | 11/2015 | Heller et al. |
| 9,530,235 B2 | 12/2016 | Strelow et al. |
| (Continued) | | |

OTHER PUBLICATIONS

Davison et al., "MonoSLAM: Real-Time Single Camera SLAM", IEEE Transactions on Pattern Analysis and Machine Intelligence, vol. 29, No. 6, Jun. 2007, 16 pgs., IEEE Computer Society.

(Continued)

*Primary Examiner* — Samir A Ahmed
(74) *Attorney, Agent, or Firm* — Vichit Chea; Brooks Kushman P.C.

(57) ABSTRACT

A system includes a processor configured to request capture of image data of an environment surrounding the user, responsive to a margin of error of a detected location of a user being above a predefined threshold. The processor is also configured to process the image data to determine an actual user location relative to a plurality of objects, having known positions, identifiable in the image data and replace the detected location with the determined actual user location.

20 Claims, 8 Drawing Sheets

(56) References Cited

U.S. PATENT DOCUMENTS

| | | | |
|---|---|---|---|
| 9,635,251 | B2 | 4/2017 | Wagner et al. |
| 9,983,022 | B2 | 5/2018 | Horita et al. |
| 9,989,969 | B2 | 6/2018 | Eustice et al. |
| 10,106,153 | B1 | 10/2018 | Xiao et al. |
| 10,134,286 | B1 | 11/2018 | Elswick et al. |
| 10,504,008 | B1 | 12/2019 | Powers et al. |
| 10,670,416 | B2 | 6/2020 | Wheeler et al. |
| 2011/0285810 | A1 | 11/2011 | Wagner et al. |
| 2012/0300020 | A1 | 11/2012 | Arth et al. |
| 2013/0057686 | A1 | 3/2013 | Genc et al. |
| 2014/0111647 | A1 | 4/2014 | Atsmon et al. |
| 2016/0055749 | A1 | 2/2016 | Nicoll et al. |
| 2017/0011631 | A1 | 1/2017 | Nordbruch et al. |
| 2017/0078576 | A1* | 3/2017 | Ryu .................. H04N 5/23254 |
| 2018/0218605 | A1 | 8/2018 | Mowatt et al. |
| 2018/0286239 | A1 | 10/2018 | Kaloyeros et al. |
| 2018/0286240 | A1 | 10/2018 | Harai |
| 2018/0341274 | A1 | 11/2018 | Donnelly et al. |
| 2018/0357907 | A1 | 12/2018 | Reiley et al. |
| 2018/0373936 | A1 | 12/2018 | Kim et al. |
| 2019/0145765 | A1 | 5/2019 | Luo et al. |
| 2019/0147221 | A1* | 5/2019 | Grabner .................... G06T 7/75 382/103 |
| 2019/0156206 | A1 | 5/2019 | Graham et al. |
| 2019/0259182 | A1 | 8/2019 | Sarukkai et al. |
| 2020/0041303 | A1 | 2/2020 | Friedman et al. |
| 2020/0089973 | A1 | 3/2020 | Efland |
| 2020/0124427 | A1 | 4/2020 | Kline et al. |
| 2020/0125107 | A1 | 4/2020 | Schlicht et al. |
| 2020/0196115 | A1* | 6/2020 | Naik ...................... H04W 4/80 |
| 2020/0226926 | A1 | 7/2020 | Suzuki et al. |
| 2020/0380711 | A1 | 12/2020 | Luo |

OTHER PUBLICATIONS

Sanchez et al., "Localization and tracking in known large environments using portable real-time 3D sensors", Computer Vision and Image Understanding 149 (2016) pp. 197-208, Elsevier.

Balzer et al., "CLAM: Coupled Localization and Mapping with Efficient Outlier Handling", CVPR2013, Computer Vision Foundation, IEEE Xplore, 8 pgs.

Salarian et al., "Accurate Image based Localization by applying SFM and coordinate System Registration", 2016 IEEE International Symposium on Multimedia, Electrical and computer Engineering Department, University of Illinois at Chicago, Chicago, USA, 4 pgs.

Piasco et al., "A survey on Visual-Based Localization: On the benefit of heterogeneous data", Pattern Recognition 74 (2018) pp. 90-109, Elsevier.

Yassin et al., "A Survey of Positioning Techniques and Location Based Services in Wireless Networks", 2015, IEEE, 5 pgs.

Yeh et al., "A Study on Outdoor Positioning Technology Using GPS and WiFi Networks", Proceedings of the 2009 IEEE International Conference on Networking, Sensing and Control, Okayama, Japan, Mar. 26-29, 2009, 5 pgs.

Huang et al., "6-DOF VR Videos with a Single 360-Camera", 2017 IEEE Virtual Reality (VR), Mar. 18-22, 2017, Los Angeles, CA, USA, 8 pgs.

Arth et al., "Wide Area Localization on Mobile Phones", Graz University of Technology, Austria, 10 pgs.

Brejcha et al., "State-of-the-Art in Visual Geo-localization", Faculty of Information Technology, Brno University of Technology, Czech., 45 pgs.

Ni et al., "Real-time Global Motion Blur Detection", MIT Lincoln Laboratory, 2012 IEEE, ICIP 2012, pp. 3101-3104.

Arth et al., "Real-Time Self-Localization from Panoramic Images on Mobile Devices", IEEE Internatioanal Symposium on Mixed and Augmented Reality Science and Technology Proceedings Oct. 26-29, Basel, Switzerland, 10 pgs., 2011 IEEE.

Gasparini et al., "Optimizing Image Registration for Interactive Applications", University of Modena and Reggio Emilia, Italy, 10 pgs.

Lynen et al., "Get Out of My Lab: Large-scale, Real-Time Visual-Inertial Localization", Computer Vision and Geometry Group, Department of Computer Science, ETH Zurich, Google, Inc., Mountain View, CA, 10 pgs.

Sattler et al., "Fast Image-Based Localization using Direct 2D-to-3D Matching", ICCV 2011, 2011 IEEE, 8 pgs.

Vidal et al., "Automatic Video to Point Cloud Registration in a Structure-From-Motion Framework", 5 pgs.

Sattler et al., "Are Large-Scale 3D Models Really Necessary for Accurate Visual Localization?", Computer Vision Foundation, IEEE Xplore, 10 pgs.

Carrera et al., "3D Scene Reconstruction with a Mobile Camera", Stanford University: CS231A, 10 pgs.

Zamir, Amir Roshan, "Visual Geo-Localization and Location-Aware Image Understanding", M.S. University of Central Florida, 2013, Spring Term 2014, 2014 Amir Roshan Zamir.

Han et al., "A review of algorithms for filtering the 3D point cloud", Signal Processing: Image Communication 57 (2017) 103-112, Elsevier.

Manweiler, "Satellites in Our Pockets: An Object Positioning System using Smartphones", Mobisys' 12, Jun. 25-29, 2012, Low Wood Bay, Lake District, UK 2012, 14 pgs.

Lim et al., "Real-time Image-based 6-DOF Localization in Large-Scale Environments" 8 pgs., 2012 IEEE.

* cited by examiner

METHOD AND APPARATUS FOR IMPROVED LOCATION DECISIONS BASED ON SURROUNDINGS

CROSS-REFERENCE TO RELATED APPLICATIONS

This application is a division of U.S. application Ser. No. 16/199,394 filed Nov. 26, 2018, now U.S. Pat. No. 11,127,162, issued Sep. 21, 2021, the disclosure of which is hereby incorporated in its entirety by reference herein.

TECHNICAL FIELD

The illustrative embodiments generally relate to methods and apparatuses for improved location decision based on surroundings.

BACKGROUND

A ride hailing service is dependent on the capability for the user and vehicle to identify each other's position accurately so the user can enter the vehicle and begin their service. Delays in users and vehicles identifying each other's locations accurately results in decreased utilization (higher costs) and potential missed rides, or loss of revenue. Positional accuracy of a mobile device, however, which is typically used to identify a requesting user's location, may be limited due to technical limitations of GNSS solutions and cellular triangulation.

Users of ride hailing services and the vehicles/drivers themselves must be able to visually identify each other through some method; however, limited sight lines due to obstructions or other environmental variables can increase the amount of time spent looking for the vehicle. An example of this issue would be a user being located at the corner of a building but being located by GNSS or cellular triangulation on the wrong side of the corner, which could result in the driver looking for the user in the wrong place, which would cause delay. Another example may be a user located on a section of the street which does not allow parking. For an autonomous vehicle (AV) and/or human drivers, this fact may prevent or delay pick up.

SUMMARY

In a first illustrative embodiment, a system includes a processor configured to request capture of image data of an environment surrounding the user, responsive to a margin of error of a detected location of a user being above a predefined threshold. The processor is also configured to process the image data to determine an actual user location relative to a plurality of objects, having known positions, identifiable in the image data and replace the detected location with the determined actual user location.

In a second illustrative embodiment, a system includes a mobile-device processor configured to obtain image data for a surrounding environment. The processor is also configured to generate a 3D point cloud from the image data using a structure-from-motion algorithm. The processor is further configured to remove temporal varying objects from the point cloud using semantic segmentation. Also, the processor is configured to convert the point cloud to a voxel map, identify key voxel features and a user location relative to the key features, and transmit image data representing hashed key voxel features and the user relative location to a server in response to a request for a locality scan.

In a third illustrative embodiment, a system includes a processor configured to receive image data, representing key environmental-object voxel features and including an estimated location relative to the features, captured from a user device. The processor is also configured to search a dataset for the features to determine object coordinates, stored in the dataset, of environmental objects having the features. Further, the processor is configured to determine a real-world location using the estimated location relative to the features compared to the coordinates of the objects determined to have the features.

DETAILED DESCRIPTION

Figure 1:
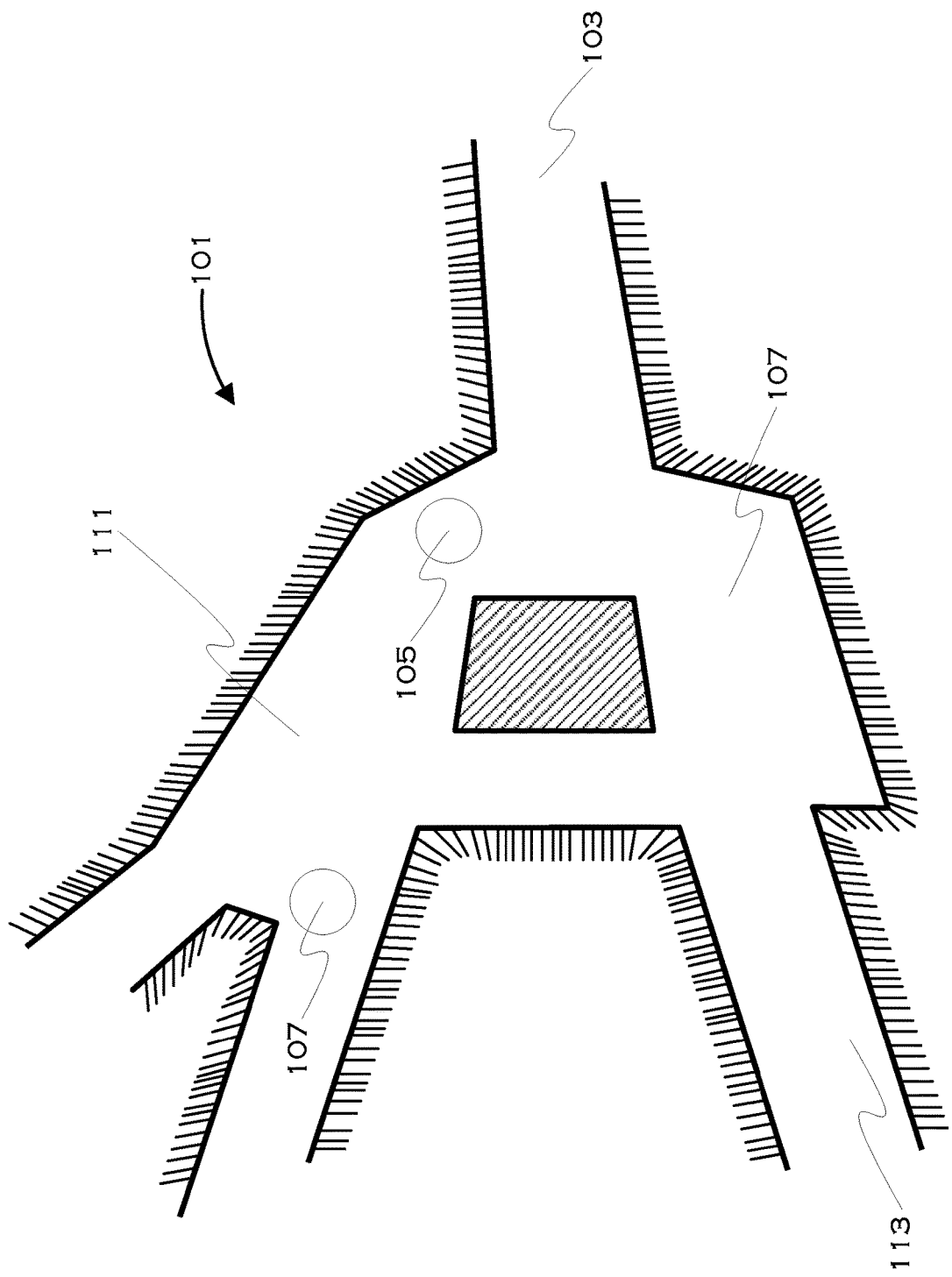
FIG. 1 shows an illustrative example of a city environment.

As required, detailed embodiments are disclosed herein; however, it is to be understood that the disclosed embodiments are merely illustrative and may be incorporated in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

It is well-known that GPS positional accuracy is intrinsically limited and can suffer from error due to external conditions such as the effects of "urban canyons". This can make it challenging for hailed vehicles, human or autonomous, to positively locate pedestrians. This may lead to longer delays between riders, vehicles finding the incorrect person(s), or even a rider being stranded after a vehicle cannot find the user at the location GPS has indicated. This is even more of an issue in an urban environment where sight lines of pedestrians and vehicles are limited.

For example, a pedestrian may be waiting on one side of a building but the vehicle may only have sight lines on another side of the building where it navigated to based on erroneous signals. Additionally, in city environments, repositioning the vehicle to locate the user would take more time than a suburban or rural environment. In this city environment it may make more sense to relocate the passenger prior to pick-up. The illustrative embodiments are capable of utilizing visual data coupled with cooperating passenger interaction to improve the efficiency of passenger pick-up transaction. This can include, for example, more accurately locating a passenger location and/or the passenger and vehicle collaborating to agree upon an efficient pickup location based on an initial passenger request location.

To date, some methods other than GPS have been utilized to localize a user. For example, ride hailing services allow a user to localize themselves by placing a pin on a map on a user's cell phone. While this may be an improvement to the initial GPS location, the position suggested may have limited precision and the user may be confused by the map orientation compared to their current physical space. Studies have shown that GPS coordinates can be off by over 50 feet under certain weather conditions, even in an open environment, and can be off by hundreds of feet in urban canyons. In a busy city environment, even an error of 20 or 30 feet can misplace a user on the wrong side of a street or a different street, and because of traffic and road constraints, this can render many pickups a practical impossibility.

In other cases, the driver and user may call one another to provide verbal instructions for navigation or further localization. This method can easily fail if the user or driver is unfamiliar with the location or there are not notable landmarks that the user can describe. In the future, where autonomous vehicles (AVs) are prevalent, there will likely be a larger density of ride hailing/sharing/pooling users in a given location. This will increase the rate of false positives compared to today's positional accuracy impacting a fleet operator's ability to control route optimization. Clearly a better method to localize and correctly identify a user in outside environments is needed. Secondarily, a better method to recommend an alternative nearby location for meetup is needed based on live conditions around the user, as static map data does not always reflect real-time conditions as would be evidenced by a live or recent image of the passenger's surroundings.

Another reason to improve the localization problem for ride hailing/sharing/pooling is to minimize the cost of downtime. Increased pickup efficiency leads to increased utilization rates, which are an important component of maximizing profitability. Decreasing the rate of a vehicle that is unable locate a user or the time required to search and load a user can both help the owner/operator maximize profit as well as improving passenger experience.

Under the illustrative embodiments, an application on a user device will generate an accurate position of the user in 3-dimensional space based on a 3D point cloud generated from imaging (e.g. video) taken by the user. Generally speaking, the application would instruct the user to take a video moving the camera around the user's position to generate a 3D point cloud using a structure-from-motion algorithm. This point cloud would be used to generate a more accurate location in 3D space and other important information which would be uploaded to the cloud so that the ride hailing vehicle could be provided the most accurate location to meet the user at. The ride hailing service may also use the data to suggest a more efficient location for the user to meet the vehicle at to reduce on-boarding time.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

FIG. 1 shows an illustrative example of a city environment 101. A user may be located at position 105, which in this example would be an unsuitable location for pickup. Also, because of the effect of urban canyons on GPS, the user's device may be reporting the user location as being at position 109. If, for example, road 111 was a one-way road, then a driver driving to position 109, not finding the user, and calling the user, could not simply turn around to pick up the user. Instead, the driver would have to find a path back to position 105, which in a busy city, in traffic, could take a significant amount of time and drastically decrease the driver's ability to earn money. Further, the user may simply tire of waiting and chose another ride option.

As will be discussed in greater detail herein, illustrative processes may request that the user take a brief video of the surrounding environments. This could be done in response to, for example, determining that a user's apparent location is in an environment known (from historical observation) to have margins of error above a predefined threshold. Or, for example, current weather conditions could indicate that the margin of error is historically likely to be above the threshold. In another example, a user could interact with a device to indicate that the detected apparent location is not actually where the user is standing.

In response to a request, the user may image or shoot video of a surrounding environment. So, for example, in FIG. 1, the user would take video of the environment surrounding position 105 (where the user is actually standing). Image/video processing can then be used to identify a user location relative to known, fixed objects identifiable in the images. For example, if a statue and a building feature are both known and identified based on crowd-sourced data or historic data, in an object database, recognition of both, along with 3D characteristics of both, which would only be viewable from a certain angle, can be used to determine the relative position of a user to both objects.

Some pre-processing may be done on a user device, as discussed herein, and the remainder of the object-matching may be done in the cloud, which may receive a set of pre-processed image data from the user device. Since video files tend to be large, sending pre-processed data may be beneficial if bandwidth and overall data transfer volume is a system constraint, although in certain systems the whole video file could also be sent, if the transfer capability were sufficient and permissible.

Once the process has identified the actual user location (the location relative to a plurality of known, fixed objects), the process may replace the detected GPS location with an actual user location for both a user device and for a driver/vehicle device. If the process also has identified an improved pickup location from the image data (or based on other data), the process may send that information as a suggestion to the user device and/or driver/vehicle device.

So, for example, the process may identify in environment 101 that the user is actually located at position 105, that there is available parking representing a safe pickup location at 107 (viewable from the user location) and that streets 113 and/or 103 are lower traffic streets and safer for pickup than the intersection around position 105. Any or all of these locations could be suggested as alternative pickup locations and the driver could be notified if the user acquiesces to a particular location. Also, since there is live image data available, the process could use the temporal objects to determine, for example, that parking in 107 was filled or that the streets were very busy, and in the latter case could recommend location 103 since it would not require the user to cross any busy streets as identified from the live image data. In other examples, recognized weather and other constraints may aid in a suitable location determination.

Figure 2:
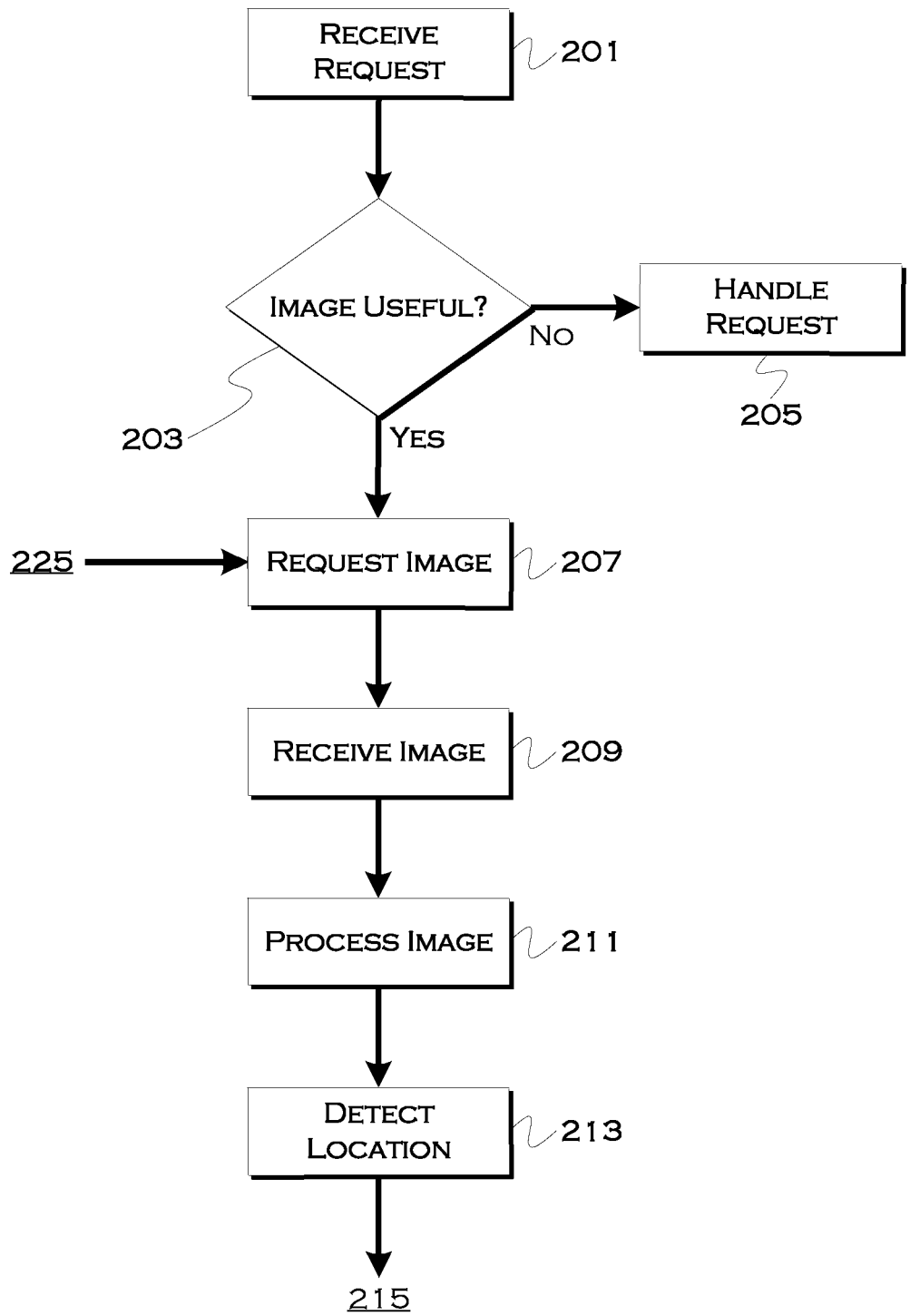
FIG. 2 shows an illustrative process for pickup request handling.
Figure 2:
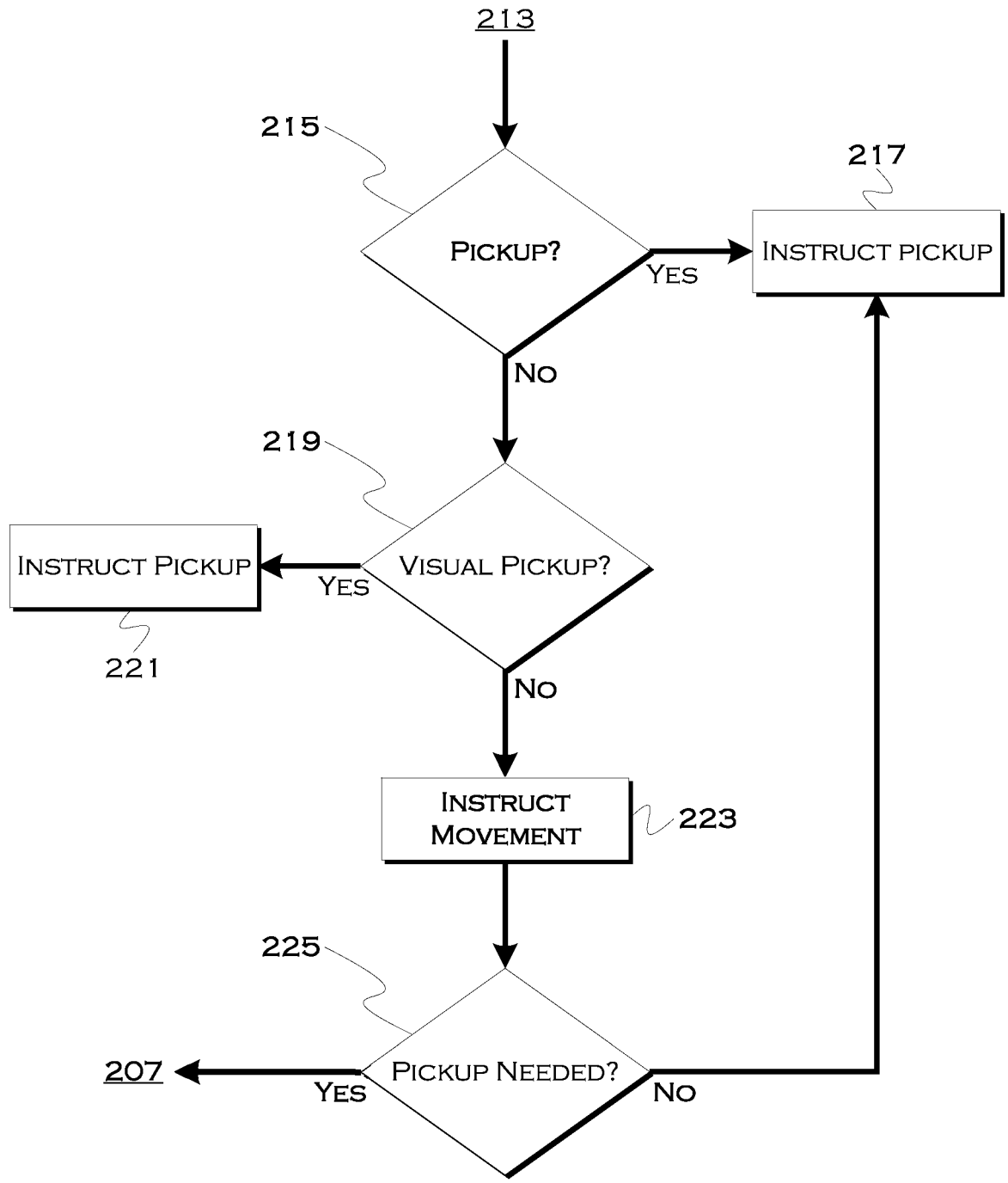

FIG. 2 shows an illustrative process for pickup request handling. In this example, a ride-hailing service receives 201 a request for pick-up. This request may include a detected user location that is detected initially based on, for example, GPS coordinates. If there is a likely margin of error associated with the GPS coordinates (e.g., they are at a location under cloud cover, they are in an urban canyon, etc), the process may determine 203 that an imaging of user surroundings may improve pinpointing of a user location. If the margin of error is slight enough, the process may simply handle 205 the request based on the detected GPS coordinates.

If the processor determines that the image will improve location determination, the process may request 207 an image of an environment surrounding a user location. This can include a plurality of still photographs, a wide-scale panoramic photograph, a video, etc. In response to the request, the process may receive 209 image data and process 211 the image data to determine a user location. In at least one example, some of this processing is done on a mobile device and can include, for example, the following.

The device performing the processing may use semantic segmentation, for example, to filter the point cloud data and the video data to remove temporal varying objects (e.g., people, vehicles) for purposes of localization. The process may also use a structure from motion algorithm to generate a 3D point cloud of the imaged environment. These objects may also be considered when determining an optimized or alternative pickup location (e.g., finding a space where the objects are not existent, or are diminished).

The process may further convert the 3D point cloud into a voxel map where key features may be identified from the image data. These key features are usable to determine a relative user position to the key features, and are further usable to reduce consideration of image data to points-of-relevance. The process may also hash key voxel features and compute an estimated user position relative to the features.

In this example, the device may perform the above pre-processing and upload the computed relative position and voxel hashes to a central server, which can use a database of object data to actually determine where the viewed features are located.

The database can include a vast array of object data, but the search can be limited to an area based on the initial detected location. So, for example, if the initial location was at position X,Y, and the projected margin of error was +100 feet, then the system could search within a circle having a radius of 300 feet around the detected location. This would, presumably, encompass both the actual user location and a number of viewed key feature points viewed from the user location. The effective goal is to avoid searching too large of a database portion, while at the same time searching a sufficient portion to find a usable enough number of the key features to confirm the user location.

Once the actual location of the key features is identified by correlation from the database, the relative user position to those key features will reveal the actual user location. So, for example, if the user is located relative to a building and a statue, once the actual location of the building and statue are known, the user's relative location will reveal the actual location of the user.

The process may also determine, based on both map data and viewed data, whether the actual location is suitable for pickup 215. That is, map data may indicate a no parking or parking zone at the location, and/or image data may indicate the presence or lack of traffic. If the user location is suitable for pickup, the process may use the user location to instruct 217 pickup.

If the user location is not suitable, the process may attempt to visually identify 219 a pickup location. If there are no visually identifiable pickup locations, the process may simply revert to using the user location. On the other hand, the process may be able to identify open parking spaces and/or low traffic or low pedestrian areas suitable for pickup, based on the presence or lack of temporal objects filtered out through the semantic segmentation. In this case, the process may instruct 223 user movement to the pickup location. Once the user arrives at the pickup location, the process may determine 225 if a new image for pickup purposes is needed. If this is the case, the process may wait until the vehicle is nearing the location, and then request a new image (to confirm the availability of a parking space, for example). If the user has simply been moved to, for example, a generally safer location, but one which is not contingent on space-availability, the pickup for that location may simply be scheduled.

Figure 3:
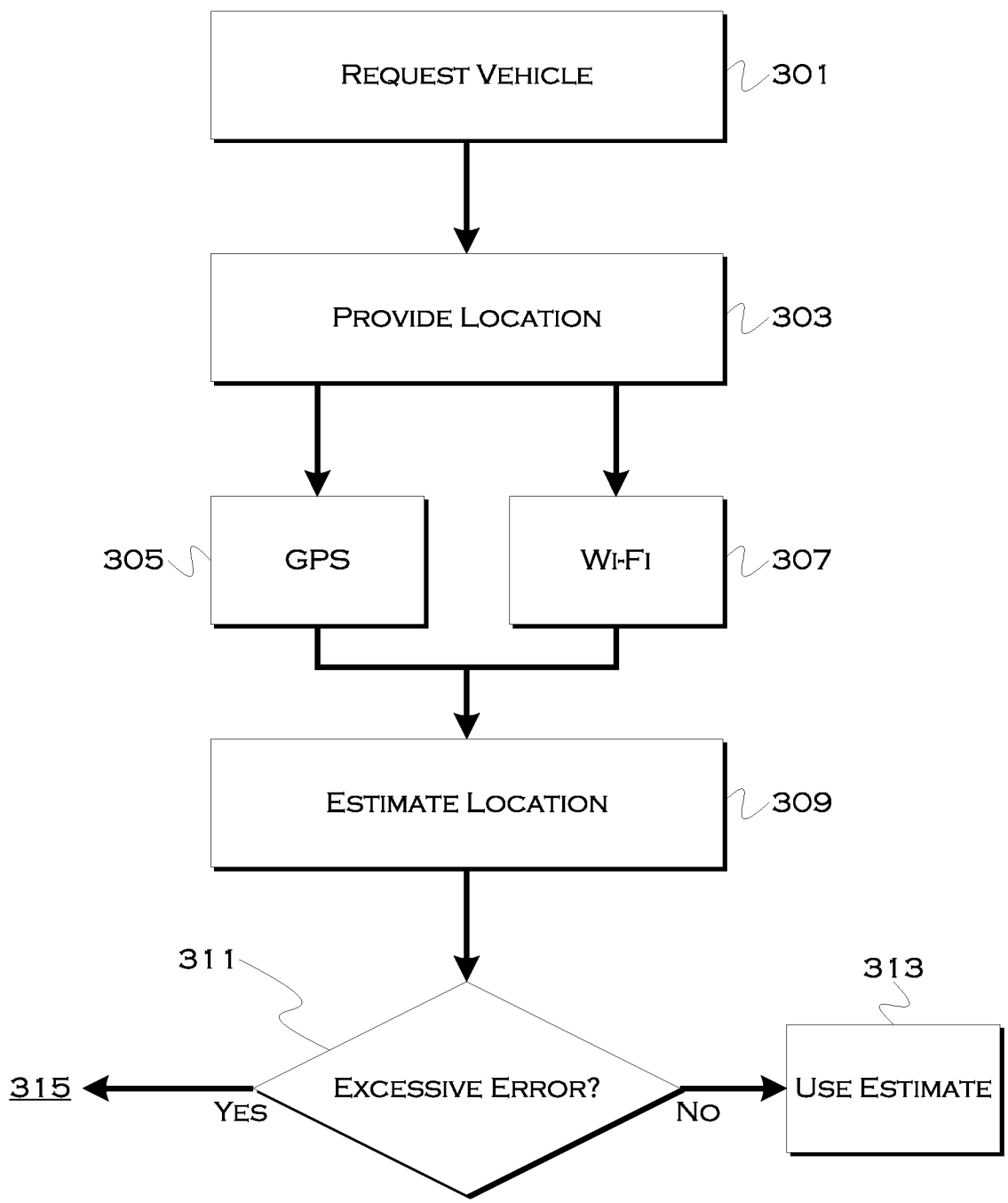
FIG. 3 shows another illustrative example of request handling.
Figure 3:
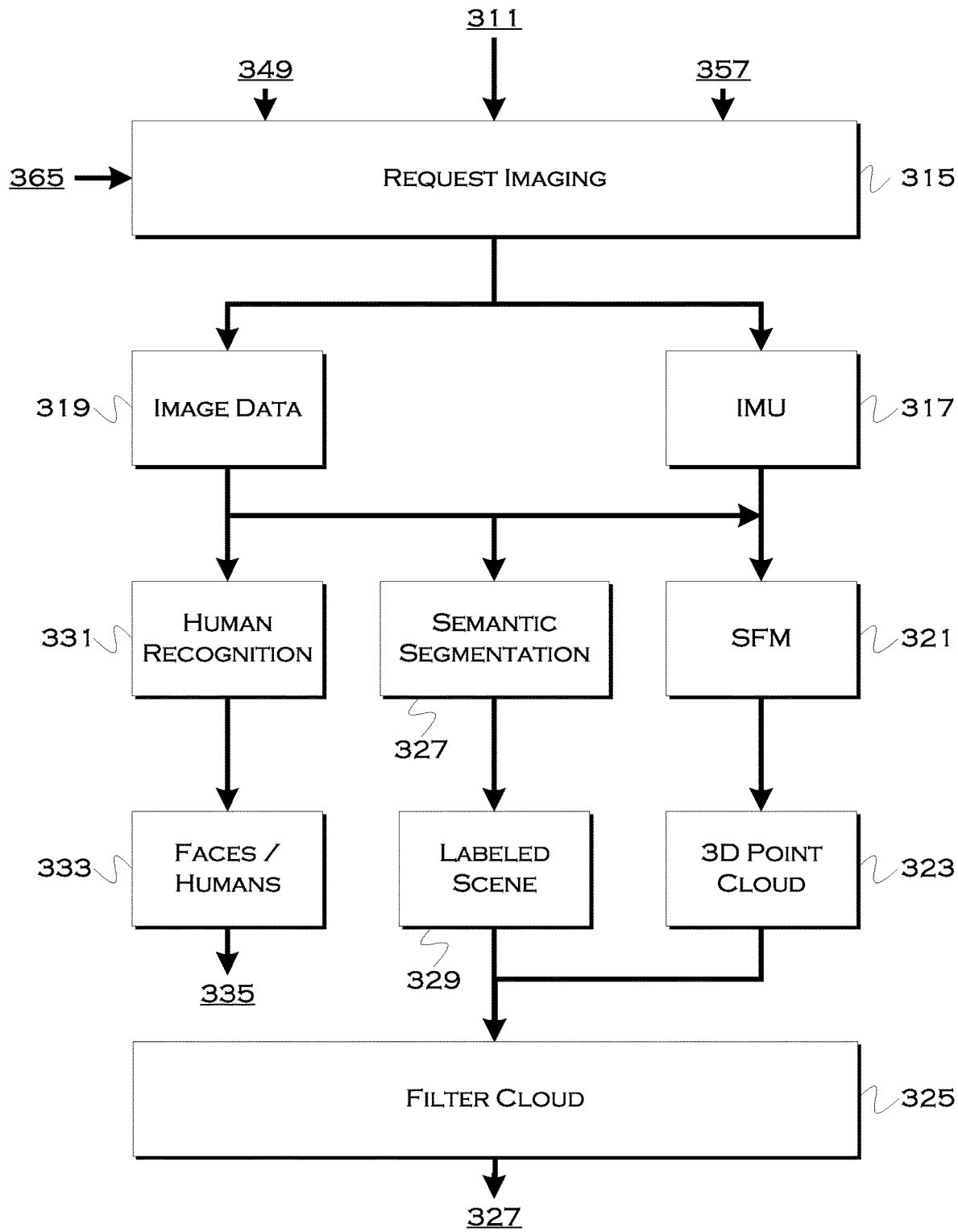
Figure 3:
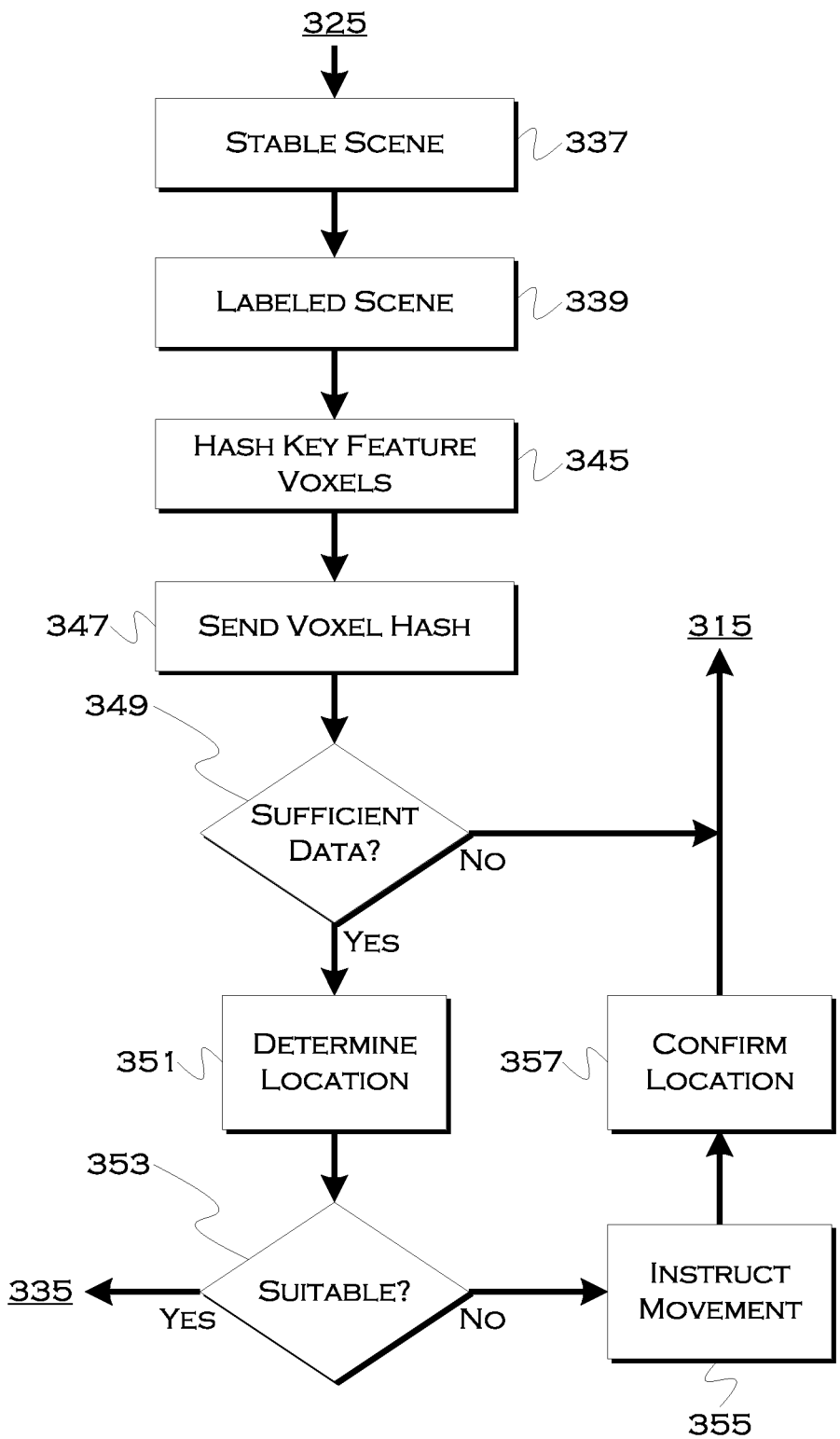
Figure 3:
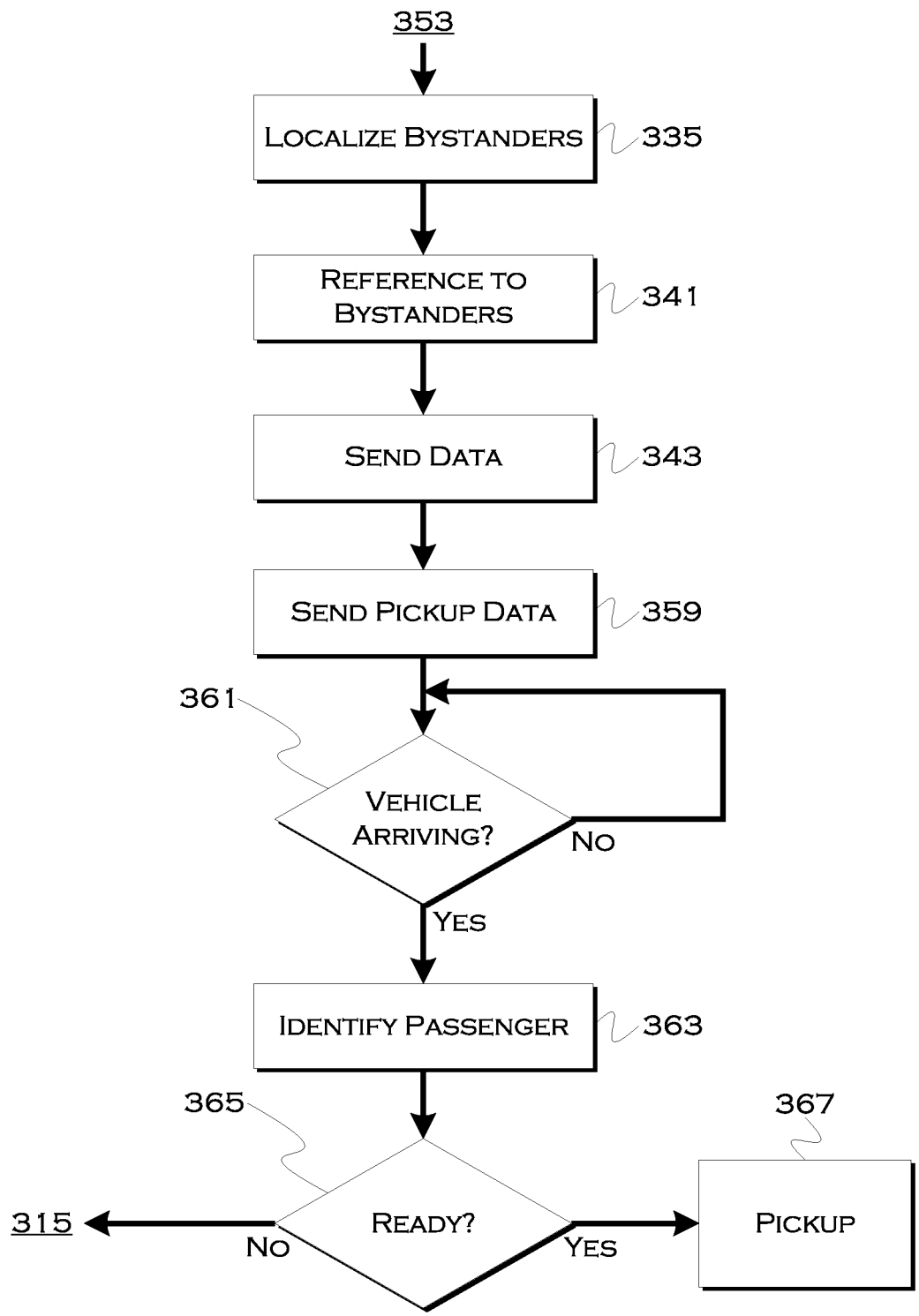

FIG. 3 shows an illustrative process that demonstrates the process of FIG. 2 in more detail. In this example, the process again begins when a user requests 301 a vehicle. This results in the user providing 303 a pickup location, which is the detected user location, for example. The process may attempt to use detected Wi-Fi networks 305 and/or a GPS location 307 to estimate a user location.

In instances where the estimated location is, for example, a location that is likely fairly accurate (e.g., a home in the suburbs), the process may simply use 313 the detected location as a pickup location and proceed. On the other hand, in instances where the location is likely to suffer from inaccuracies (e.g., bad weather, urban canyons) 311, the process may request 315 that a user scan a surrounding location.

A determination that a user may need to scan surrounding areas to image those areas may be based on, for example, location history, which can include: average GPS inaccuracy at estimated location; average delay to pick up customer at estimated location, a rate of users not located events at estimated location. Other factors could include a user history of inaccuracy (the user's device provides bad data), time of day, day of week, etc. Street activity, special events, and other data sources may capture effects of extra busy streets which might make locating a user more difficult. This data may include historical and semi-real time data obtained by other nearby user's scanning their environment to indicate level of traffic, traffic flow, parking space availability, density of pedestrians, etc. Further data may include weather events that affect GPS accuracy and Wi-Fi dataset and accuracy at location.

Business logic may also dictate whether or not the customer is asked to scan an environment. Discussed by example in FIG. 4, the business logic may generally set an upper threshold on the risk of delay and the inability to find a customer that balances the cost of requesting a customer scan his or her location. For example, a request to scan the environment may occur if the risk of delay is greater than 5 minutes or the risk of inability to locate customer is 10%. This request may also be based on the past customers agreement or refusal to scan their environment for localization.

Other factors for querying to scan the environment may include, but are not limited to: the user's past propensity to agree to scanning their location or moving to an alternative pick up location or high-definition (HD) map information which may indicate road factors such as lack of available street parking on one or more sides of the road or other similar factors.

If a user may be asked to move, the suggested location distance compared to the decrease in pickup delay and risk of not finding the passenger may be balanced by the cost of the user annoyance to shift location. This may be set by some business logic equation. For example, a request to move N meters away might be required to save N/10 minutes of delay or more.

A request to the user to take video/images of his or her external surroundings at their present location may utilize GPS, inertial measurement units (IMU), detected Wi-Fi networks and the accompanying images generated. For purpose of generating the image, the phone may display a visual or auditory request with an instructional image or animation to help guide the user to start the scan. The cell phone may output continuing auditory or visual instructions during scanning to update the user on the progress of the scan or provide further instructions.

Additionally, the device may display recommended pan and tilt motion via auditory instructions or via displaying the scene and written or iconographic instructions (e.g., arrows) on the screen facing the user to capture missing perspectives of the current scene. The phone may provide input to the user to slow their motion or panning of the device when capturing images to avoid motion blurring. This can be accomplished by inspecting the resulting images for signs of unidirectional image blur. The phone may recommend the user to pan or tilt in certain directions based on what has been captured so far in the scanning process. The nomadic device, e.g., a cell phone, could image the region repeatedly capturing images as the user moved the phone around as determine by accelerometers to indicated a change in the pan, yaw, or other perspective and if the user is walking through the environment. In addition, as the scene changed the phone would capture additional images even within the same scene to understand temporal nature of the environment (pedestrian flow, traffic flow). Alternatively, a video image can be used.

The phone may then provide confirmation once the scene has been imaged sufficiently to produce a 3D point cloud that has captured the needed 3D scene details to try and localize the user in space. The phone may utilize accelerometers and forward and rear facing camera to determine the motion of the phone which is a composition of the user walking in space and the user moving the phone about the person to gain an adequate view of the scene.

Once an adequate image is obtained, the process may use the IMU 317 data and image data 319 to derive a plurality of aspects of the data. For example, the process may use a structure from motion (SFM) algorithm 321 to derive a 3D point cloud scene around a user.

In another aspect, the process may use semantic segmentation 327 to derive a labeled scene 329 including various temporal objects such as people and vehicles. In still a third aspect, the process may find humans or face in the image 331 to derive a composition of humans that are definitively not the user.

The temporal objects derived from semantic segmentation can be filtered 325 from the 3D point cloud to derive a temporarily stable, labeled 3D scene 337 representative of the view from the user's location.

The structure from motion and following compression into voxel hashes could occur on the mobile device in real-time. By the real-time creation of an augmented reality 3D scene the user may judge their scanning progress (for example, a split window view may show the "real" view and an augmented reality view being generated in real-time. Additionally, the voxel conversion of fixed infrastructure may be displayed on the user's device to provide further feedback on the progress and quality of localization.

The 3D point cloud data and video data will be filtered through use of semantic segmentation to remove temporal varying objects. Temporal objects, e.g., vehicles/pedestrians may be used to determine optimal alternative location for pickup.

The images used to generate the SFM 3D point cloud may include points in space that correspond to objects or visual features that vary in time. For example, people or vehicles may be captured in a recording of the area by the user, but those objects would not correspond to historical mappings of the area stored in databases and the like.

As such, sematic segmentation will be used to classify the pixels in the image corresponding to a designated class. Feature points detected in the respective images which belong to the temporally varying classes, e.g. a car, that are projected into a 3D space using SFM algorithm may be discarded or ignored. The results of this process will be to capture point clouds only from temporally stable features such as fixed infrastructure, building facades, tree foliage, and other features. This will make the process of localization far more stable in to changes in a local environment. In addition, classification of fixed objects may be used later to label the 3D point cloud, voxel map, and by extension the voxel hashes.

Temporally varying objects may also be labeled and measured. They may be directly uploaded to the central server or aggregated into a single statistic (e.g., percentage of open street parking, pedestrian density). This data may be used to determine if an alternative meeting location may be necessary.

A secondary usage for such data may be used to maintain a map of relevant features of a city environment which may be used for vehicle routing information or proactively suggesting a nearby alternative meeting location for nearby user's later request.

The point cloud may additionally be smoothed or filtered via sparse statistical based filtering such as outlier detection, neighborhood-based filtering, projection-based filtering, Laplacian smoothing, and others.

An algorithm may then convert the 3D point cloud into a voxel map 339 where key features may be identified. One effect of this step is to reduce the data transferred to a central server per each user. By converting temporally stable classified point cloud points into a voxel map (and later hashed), the process can dramatically reduce the file size.

In the aspect where people are identified, the process can localize a person's location relative to identified bystanders 335, 341. This may be useful, for example, to assist a driver, device or vehicle in identifying a user within a crowd. Since people tend to move around, such an image aspect may be captured moments before the vehicle arrives, and the driver or vehicle could use the images of who the user isn't to help identify who the user is, within a crowd of people.

This will be described later in greater detail, but generally speaking the process can transmit non-user 343 bystanders to the cloud for processing and/or transfer to the vehicle 359. This data can be used to, for example, navigate to a portion of the crowd reflected by the data (and presumably thus near the user) and viewed by the vehicle 361 and/or, for example, provide an augmented reality view of the crowd for a driver that can identify non-user entities and help the driver single out the user.

Moving back to the 3D point cloud data, the process can hash this data 345, for example, the key feature point data, and send the voxel hashes back to a central server for processing. If the server cannot use the present key feature voxel hashes to localize the surroundings 349, the scan process may repeat. Otherwise, the server may use an HD map and/or other image data to localize the key features. Once the actual locations of the key features are known, the relative position of the user, to the features (as determined based on the perspective of view of the features) will reveal the location of the user in the real world.

If this location is optimal or suitable for pickup 353, the process can use the bystander data (or request bystander data when a vehicle approaches) to localize the user at the location and to help guide the vehicle to as near a precise pickup spot as possible.

If the location is not suitable, the process can use HD maps (since the location of the user is now known with precision), and/or other data, including visual image data indicating available parking, to determine a more suitable pickup location 355. This can include a safer location, a location with fewer pedestrians or vehicles, an open parking space, etc. This can also be confirmed 357 with the customer.

As the vehicle arrives, the process can enact filters to sort out visually identified non-users (e.g., in an augmented reality display) 363 and also determine if the customer has moved 365. If the customer cannot be found or appears to have moved (which can also be indicated by phone accelerometer data), the process can repeat the scan process. In at least one example, the localized phone processing and reduced cloud-sent data size results in fairly fast processing, so it is not unreasonable from a time perspective to ask a user to re-scan and process the image, even if the vehicle is arriving or has arrived.

Figure 4:
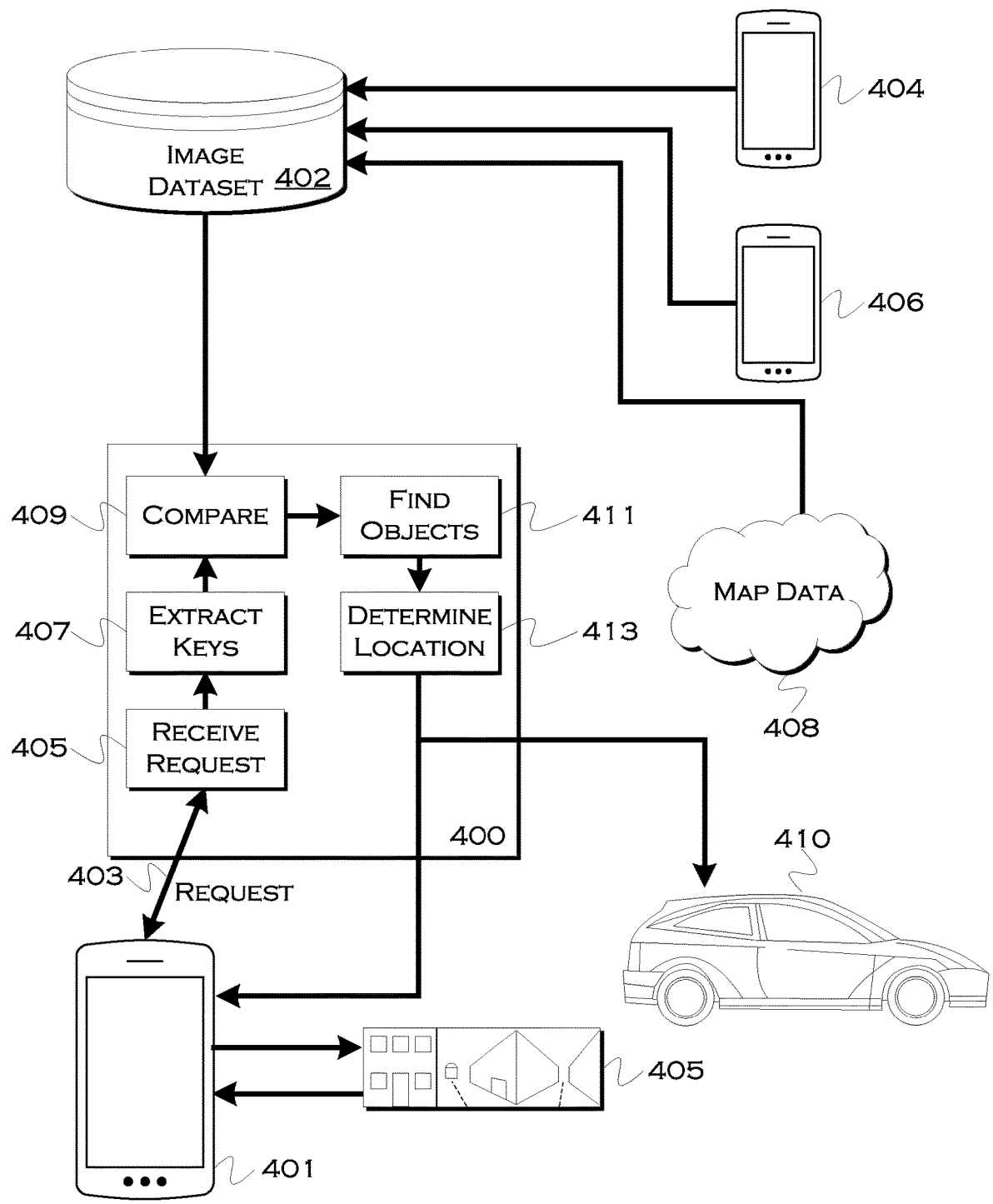
FIG. 4 shows an illustrative system for request handling.

FIG. 4 shows an illustrative system for request handling. This is one example of how the data may flow between entities and sources for various data used in illustrative solutions. In this example, a user or passenger has a mobile device 401 that is used to initiate a request for pickup 403. Since the remote system 400 may require improved location information, the request communication may require back-and-forth communication.

When the remote processing receives 404 the request, it can determine if a better location is needed, and, if so, instruct a user to image the surroundings. The user can use the mobile device to scan an image, series of image or video 405 of surroundings. Further, as noted herein, the device may perform some preprocessing on the image before sending the image back to the remote server 400.

Once the server receives, in this example, key image elements as hashed data, the server can unpack the data and extract 407 the key feature elements. In a large image dataset 402, there may be many key features that seemingly replicate. Thus, searching the entire image dataset may produce many results for a key feature. On the other hand, if the remote system searches in localities around the initial projected location, the set of data actually considered may be greatly reduced. Further, because, while a certain feature may appear to replicate, multiple features identified in the received data will typically only be present at a single location. E.g., a building feature may replicate, but there may be only one coincidence of the building feature viewably proximate to a statue feature. Data from various other users 404, 406, as well as HD map data 408, can be used to build the large data set, and the objects in the dataset can have both key feature comparators and physical locations associated therewith. The physical locations can serve as a constraint on the searching, for comparison 409 to the extracted key features. The physical locations can then, when a match is found, be used to physically locate the objects to which the features correspond 411.

By knowing the location of the user relative to the objects (received from the user device, in this case), the remote system can determine an actual user location by extrapolating a relative location to the now-identified physical object locations 413. This actual location can then be sent back to the user to improve the onsite location, as well as be sent to a requested ride 410.

By using visual object characteristics, which as a group tend to represent a unique perspective from a unique location, the illustrative embodiments can improve the ability to locate a user's true location, further improving user location services and rideshare servicing times. The novel, uncommon and atypical examples and concepts described herein demonstrate potential improvements achievable through use of those examples, concepts, and the like.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A system comprising:
  a processor configured to:
    receive data, representing key environmental-object key features from a voxel map and including an estimated user device location relative to the features, the data including image data captured from the user device and the key features from the voxel map provided by the user device and included in the data;
    search an image dataset for the features, located within a predefined distance of the estimated location, to determine object coordinates, identifiable in the dataset, of environmental objects having object features corresponding to the key features when viewed from the perspective of the estimated location; and determine a real-world location, of a user of the user device, using the estimated location relative to the received key features compared to the determined coordinates of the objects determined to have the features.

2. The system of claim 1, wherein the dataset includes a high-definition map dataset.

3. The system of claim 1, wherein the dataset includes crowdsourced data previously received from predefined locations representing the environmental objects as viewed from the known locations.

4. The system of claim 1, wherein the processor is further configured to:
receive detected location data, detected by the user device and indicating a coordinate location of the user device as observed by the user device;
estimate a margin of error of the detected location; and
determine the predefined distance based at least in part on the estimated margin of error.

5. The system of claim 4, wherein the margin of error is estimated based on an observed historical margin of error associated and stored with respect to the detected location.

6. The system of claim 5, wherein the margin of error is further estimated based on a correlation between the detected location and data indicating the detected location is experiencing weather that is predefined as causing location error.

7. The system of claim 5, wherein the margin of error is further estimated based on a correlation between a type of location determined for the detected location and a predefined type of location defined as being associated with error in coordinates.

8. A method comprising:
receiving data, representing key environmental-object key features from a voxel map and including an estimated user device location relative to the features, the data including image data captured from the user device and the key features from the voxel map provided by the user device and included in the data;
searching an image dataset for the features, located within a predefined distance of the estimated location, to determine object coordinates, identifiable in the dataset, of environmental objects having object features corresponding to the key features when viewed from the perspective of the estimated location; and
determining a real-world location, of a user of the user device, using the estimated location relative to the received key features compared to the determined coordinates of the objects determined to have the features.

9. The method of claim 8, wherein the dataset includes a high-definition map dataset.

10. The method of claim 8, wherein the dataset includes crowdsourced data previously received from predefined locations representing the environmental objects as viewed from the known locations.

11. The method of claim 8, further comprising:
receiving detected location data, detected by the user device and indicating a coordinate location of the user device as observed by the user device;
estimating a margin of error of the detected location; and
determining at least the predefined distance based at least in part on the estimated margin of error.

12. The method of claim 11, wherein the margin of error is estimated based on an observed historical margin of error associated and stored with respect to the detected location.

13. The method of claim 11, wherein the margin of error is further estimated based on a correlation between the detected location and data indicating the detected location is experiencing weather that is predefined as causing location error.

14. The method of claim 11, wherein the margin of error is further estimated based on a correlation between a type of location determined for the detected location and a type of location defined as being associated with error in coordinates.

15. A non-transitory storage medium, storing instructions that, when executed, cause a processor to perform a method comprising:
receiving data, representing key environmental-object key features from a voxel map and including an estimated user device location relative to the features, the data including image data captured from the user device and the key features from the voxel map provided by the user device and included in the data;
searching an image dataset for the features, located within a predefined distance of the estimated location, to determine object coordinates, identifiable in the dataset, of environmental objects having object features corresponding to the key features when viewed from the perspective of the estimated location; and
determining a real-world location, of a user of the user device, using the estimated location relative to the received key features compared to the determined coordinates of the objects determined to have the features.

16. The storage medium of claim 15, wherein the dataset includes a high-definition map dataset.

17. The storage medium of claim 15, wherein the dataset includes crowdsourced data previously received from predefined locations representing the environmental objects as viewed from the known locations.

18. The storage medium of claim 17, further comprising:
receiving detected location data, detected by the user device and indicating a coordinate location of the user device as observed by the user device;
estimating a margin of error of the detected location; and
determining at least the predefined distance based at least in part on the estimated margin of error.

19. The storage medium of claim 18, wherein the margin of error is estimated based on an observed historical margin of error associated and stored with respect to the detected location.

20. The storage medium of claim 18, wherein the margin of error is further estimated based on at least one of a correlation between the detected location and data indicating the detected location is experiencing weather defined as resulting in error, or a correlation between a type of location determined for the detected location and a type of location predefined as being associated with error in coordinates.

* * * * *